(12) United States Patent
Kluemper et al.

(10) Patent No.: US 7,510,505 B2
(45) Date of Patent: Mar. 31, 2009

(54) POWERTRAIN AND METHOD OF OPERATION

(75) Inventors: Kevin L. Kluemper, Monrovia, IN (US); John P. Kresse, Martinsville, IN (US)

(73) Assignee: General Motors Corporation, Detroit, MI (US)

( * ) Notice: Subject to any disclaimer, the term of this patent is extended or adjusted under 35 U.S.C. 154(b) by 392 days.

(21) Appl. No.: 11/467,960

(22) Filed: Aug. 29, 2006

(65) Prior Publication Data

US 2008/0058160 A1  Mar. 6, 2008

(51) Int. Cl.
*F16H 61/00* (2006.01)

(52) U.S. Cl. ....................................................... 477/168

(58) Field of Classification Search ........................ None
See application file for complete search history.

(56) References Cited

U.S. PATENT DOCUMENTS

| 5,989,156 | A | * | 11/1999 | Matsubara et al. | 477/169 |
| 6,049,752 | A | * | 4/2000 | Katakura et al. | 701/68 |
| 6,679,807 | B2 | * | 1/2004 | Kato et al. | 477/107 |

* cited by examiner

*Primary Examiner*—Dirk Wright

(57) ABSTRACT

A method of releasing a lockup clutch for a fluid coupling assembly disposed between an engine and an automatically shiftable transmission during a negative engine torque mode of operation is provided. The method includes the steps of: A) determining a current engine torque value prior to commanding the engine to ramp to a target engine torque value; B) commanding the engine to a target engine torque value wherein the target engine torque value is one of a zero and near zero value; C) holding the engine at the target engine torque value; and D) releasing or disengaging the lockup clutch when the engine is operating at the target engine torque value. A powertrain is also provided having a controller sufficiently configured to operate according to the method of the present invention.

16 Claims, 3 Drawing Sheets

POWERTRAIN AND METHOD OF OPERATION

TECHNICAL FIELD

The present invention relates to a powertrain and method of operation, and more specifically, to a powertrain and method of disengaging or releasing a lockup clutch.

BACKGROUND OF THE INVENTION

Modern vehicular powertrains incorporating an engine, such as an internal combustion engine, and a transmission, such as an automatically shiftable transmission, typically include a fluid coupling disposed therebetween. The fluid coupling operates to substantially decouple the engine from the transmission to allow the vehicle so equipped to come to rest without causing the engine to stall. Additionally, as in the case of a torque converter, the fluid coupling may operate to provide a measure of engine torque multiplication within the powertrain.

Further, the fluid coupling may serve to impede or damp the oscillations, caused by the firing pulses of the engine, from being transmitted to the transmission and other components within the powertrain. To increase the operating efficiency of the powertrain, some fluid couplings incorporate a lockup clutch, sometimes refereed to as a torque converter clutch (TCC). The lockup clutch is selectively engageable to substantially couple the engine to the transmission thereby reducing any slip that may be occurring within the fluid coupling. In order to make the engagement and disengagement, or release, of the lockup clutch imperceptible to the operator of the vehicle, careful attention is paid to provide optimal powertrain operating conditions during such operations.

The engine may provide an amount of engine braking when the vehicle is coasting or decelerating. This condition will cause the engine to "motor" or experience negative torque as a result of pumping losses. The operator of the vehicle may feel a shock or impulse should the lockup clutch be disengaged or released while the engine is experiencing a large amount of negative torque.

SUMMARY OF THE INVENTION

A method of disengaging or releasing a lockup clutch for a fluid coupling assembly, such as a torque converter assembly, disposed between an engine and an automatically shiftable transmission during a negative engine torque mode of operation is provided. The method includes the steps of: A) commanding the engine to a target engine torque value wherein the target engine torque value is one of a zero and near zero value; B) holding the engine at the target engine torque value; and C) releasing or disengaging the lockup clutch when the engine is operating at the target engine torque value and a sufficient amount of time has elapsed to enable release of the lockup clutch. The method may further include determining or capturing a current engine torque value prior to commanding the engine to ramp to the target engine torque value.

A powertrain is also provided including an engine, transmission, and fluid coupling assembly disposed between the engine and the transmission and having a lockup clutch operable to substantially lock the engine with the transmission for unitary rotation. The powertrain further includes at least one controller sufficiently configured to: command the engine to ramp to a target engine torque value during engine braking conditions, wherein the target engine torque value is zero or near zero; hold the engine at the target engine torque value; and release the lockup clutch when the engine is operating at the target engine torque value.

In one embodiment, the at least one controller may include a transmission controller operable to communicate command signals to the transmission and an engine controller operable to communicate command signals to the engine. The engine controller and transmission controller may communicate with each other over a data link. The fluid coupling assembly may be a torque converter, while the transmission may be an automatically shiftable transmission. Additionally, the engine may be one of a spark-ignited and a compression-ignited internal combustion engine.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
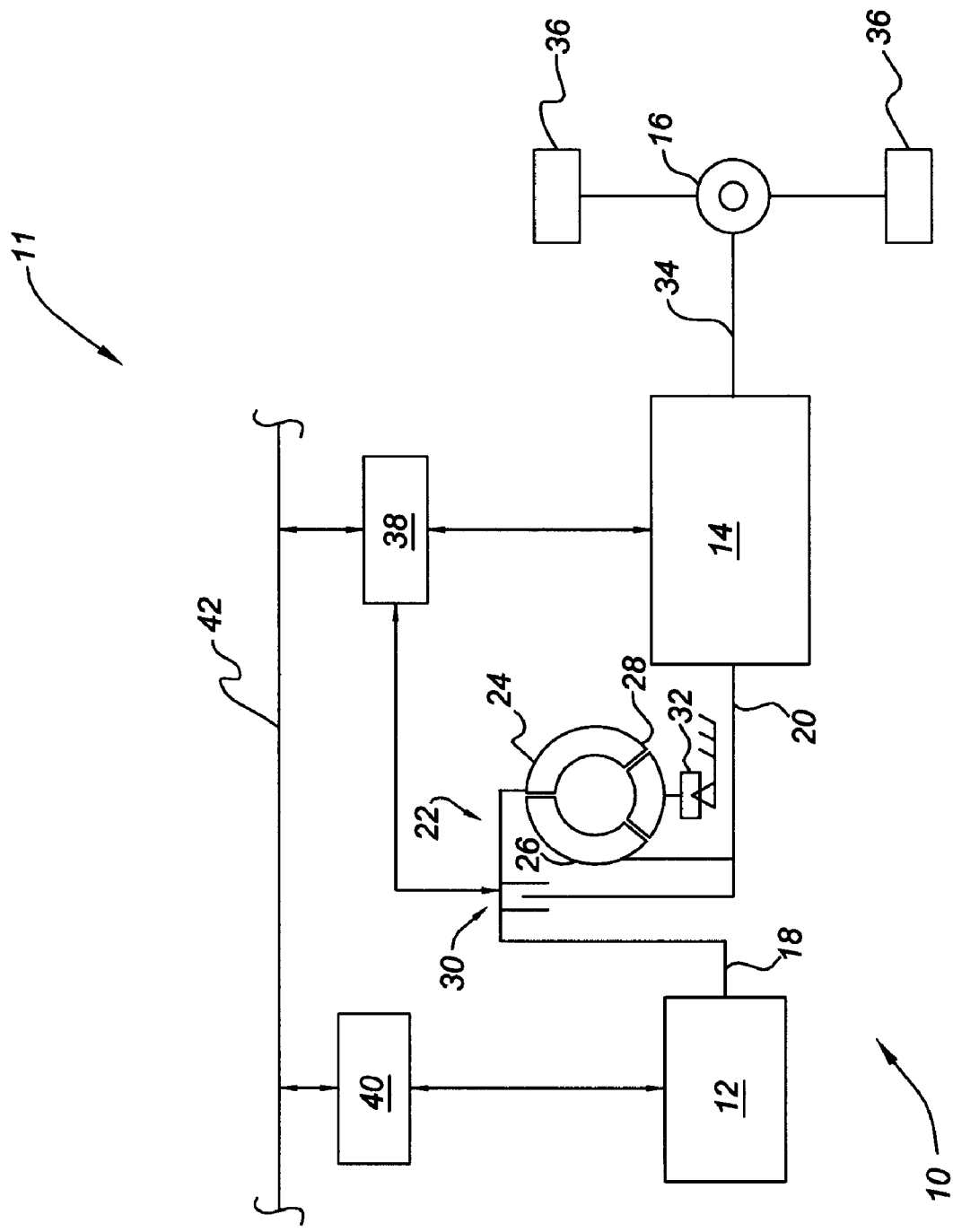
FIG. 1 is a schematic illustration of a powertrain including an engine, fluid coupling, lockup clutch, engine controller, and transmission controller consistent with the present invention.

Referring to FIG. 1, there is shown a powertrain 10 for a vehicle 11, a portion of which is shown in FIG. 1, including an engine 12, transmission 14, and a final drive 16. The engine 12 is preferably an internal combustion engine such as a spark-ignited or compression-ignited engine. The transmission 14 is preferably an automatically shiftable transmission incorporating a plurality of planetary gearsets, not shown, therein to provide a plurality of speed ratios. The final drive 16 may be a differential or other device known to those skilled in the art of vehicle design.

The engine 12 includes an output shaft 18 operable to provide torque to an input shaft 20 of the transmission 14. A fluid coupling assembly 22 is disposed between the output shaft 18 and the input shaft 20. The fluid coupling assembly 22 is shown in FIG. 1 as a torque converter and includes an impeller member 24, turbine member 26, stator member 28, and lockup clutch 30. The turbine member 26 and stator member 28 are disposed in toroidal fluid flow relationship with the impeller member 24. The stator member 28 is connected via a one-way clutch device 32 to a stationary component or housing, not shown, of the transmission 14. The lockup clutch 30 is selectively engageable to selectively lock or join the output shaft 18 with the input shaft 20 for substantially unitary rotation therewith. The lockup clutch 30, when engaged, operates to increase the operating efficiency of the powertrain under certain driving conditions such as highway driving and other operating conditions when slip between the impeller member 24 and the turbine member 26 of the fluid coupling assembly 22 is near a minimum.

The transmission 14 includes an output shaft 34 mechanically interconnected with the final drive 16. The final drive 16 operates to transfer torque from the output shaft 34 to wheels 36 of the vehicle 11. The powertrain 10 is also operable to absorb torque from the wheels 36 in what is commonly referred to as "engine braking". During engine braking, torque is transferred from the wheels 36 through the final drive 16 and the transmission 14 and is at least partially absorbed by the engine 12 through the pumping losses incurred by pumping air through the cylinders, not shown, of the engine 12. The engine 12 experiences negative torque during engine braking, that is, the engine 12 is absorbing torque from the powertrain 10 instead of providing torque to the powertrain 10 as is the case when the engine 12 is firing.

A transmission controller 38 is provided to communicate control signals to, and receive operational parameter signals from, the transmission 14. The transmission controller 38 is further operable to control the selective engagement of the lockup clutch 30. An engine controller 40 is provided to communicate control signals to, and receive operational parameter signals from, the engine 12. The transmission controller 38 and the engine controller 40 are preferably microprocessor based and communicate with each other over a data link 42. The transmission controller 38 is sufficiently configured to execute a method 44, shown in FIG. 2, of the present invention.

Figure 2:
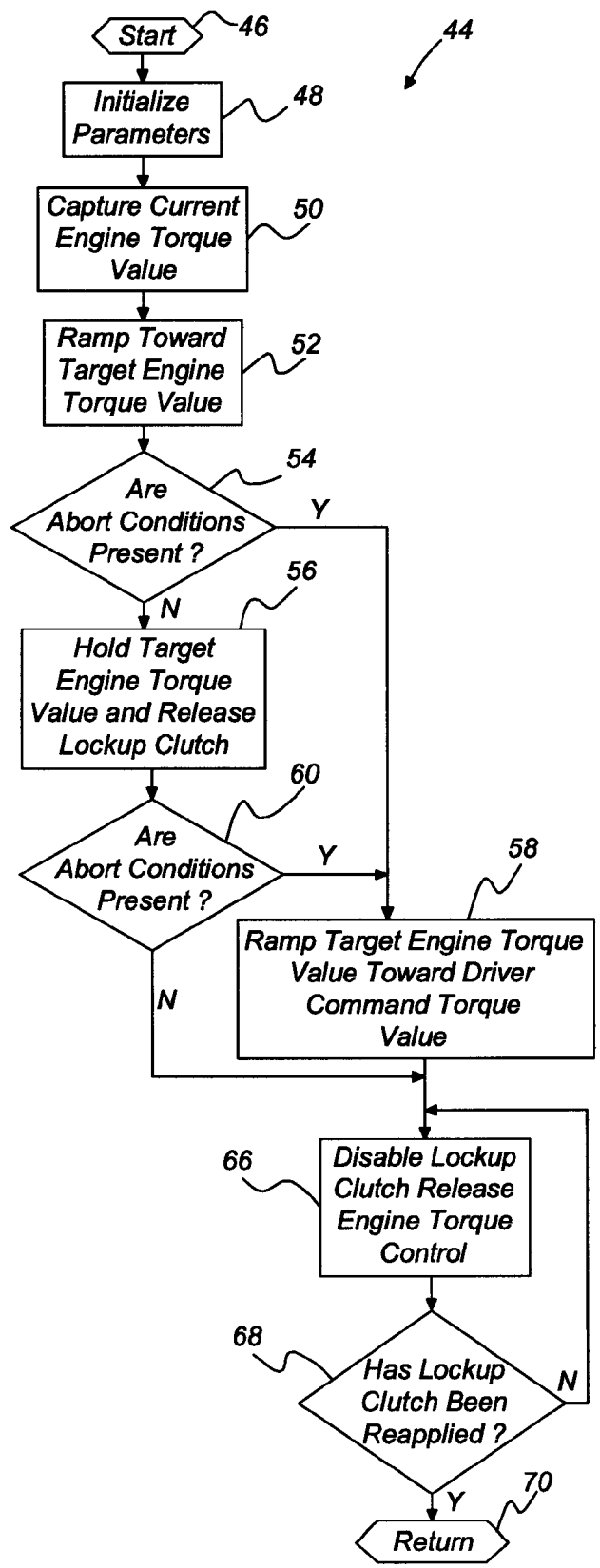
FIG. 2 is a method, in flowchart form, of disengagement or release the lockup clutch of FIG. 1 consistent with the present invention.

Referring to FIG. 2, and with continued reference to FIG. 1, there is shown the method 44 of disengaging or releasing the lockup clutch 30 during engine braking conditions of the vehicle 11, wherein the engine 12 experiences negative torque. The method begins at step 46 and proceeds to step 48. At step 48, parameters are initialized such as any timers that require resetting. Thereafter the method 44 proceeds to step 50 where the transmission controller 38 captures the current engine torque value from the engine controller 40 over the data link 42. The current engine torque value may be obtained though lookup tables containing representative values of engine torque for various engine rotational speed and engine load conditions of the engine 12 or may be obtained through direct measurement.

Having captured the current engine torque value, the transmission controller 38 will request that the engine controller 40 ramp or increase the engine torque value to a target engine torque value, as shown in step 52. The target engine torque value is preferably zero or near zero and negative. However, those skilled in the art will recognize that the target engine torque value may be near zero and positive while remaining within the scope of that which is claimed. The engine controller 40 will command the engine 12 to increase in torque either by increasing the throttle opening in the case of a spark-ignited internal combustion engine, or increasing the fueling rate in the case of a compression-ignited internal combustion engine.

The method then proceeds to step 54 where a determination is made as to whether abort conditions are present. The abort conditions may include such considerations as: whether a commanded throttle value is greater than, or equal to, a threshold value signaling a driver request for increased engine torque by depressing the accelerator pedal; whether a driver command torque value is greater than, or equal to, a threshold value signaling a driver request for increased engine torque; whether a range shift is being completed, and whether engine braking is requested. If none of the abort conditions are present, the method 44 proceeds to step 56 where the target engine torque value is held for a predetermined amount of time to enable release of the lockup clutch 30. The lockup clutch is released at step 56. If any of the abort conditions are present, the method 44 proceeds to step 58 where the target engine torque value is ramped toward a driver commanded engine torque value, which will allow the engine 12 to produce positive torque in response to driver requests.

At step 60, a determination is once again made as to whether abort conditions are present. The abort conditions include all of those described hereinabove and may also include considerations such as: whether the fluid coupling assembly 22 has been slipping for greater than or equal to a predetermined amount of time; whether the lockup clutch 30 has been reapplied; and whether the engine torque has been held at the target engine torque value for greater than or equal to a predetermined amount of time. If none of the abort conditions are present, the method 44 loops to step 66, described hereinbelow. Alternately, if any of the abort conditions are present, the method 44 proceeds to step 58 where the target engine torque value is ramped toward the driver command engine torque value, which will allow the engine 12 to produce positive torque in response to driver requests.

The method 44 proceeds from step 58 to step 66 where the lockup clutch release torque control is disabled. That is, the transmission controller 38 will not attempt to ramp and hold the engine torque value at the target engine torque value. The lockup clutch release torque control will remain disabled until the lockup clutch 30 is reapplied or commanded to engage. The method 44 proceeds to step 68 where a determination is made as to whether the lockup clutch 30 has been reapplied or commanded to engage. If the lockup clutch 30 has been reapplied or commanded to engage, the method returns to step 46 from step 70 to begin the method 44 again. Alternately, if the lockup clutch 30 has not been reapplied or commanded to engage, the method 44 loops to step 66 where the lockup clutch release engine torque control remains disabled.

Figure 3A:
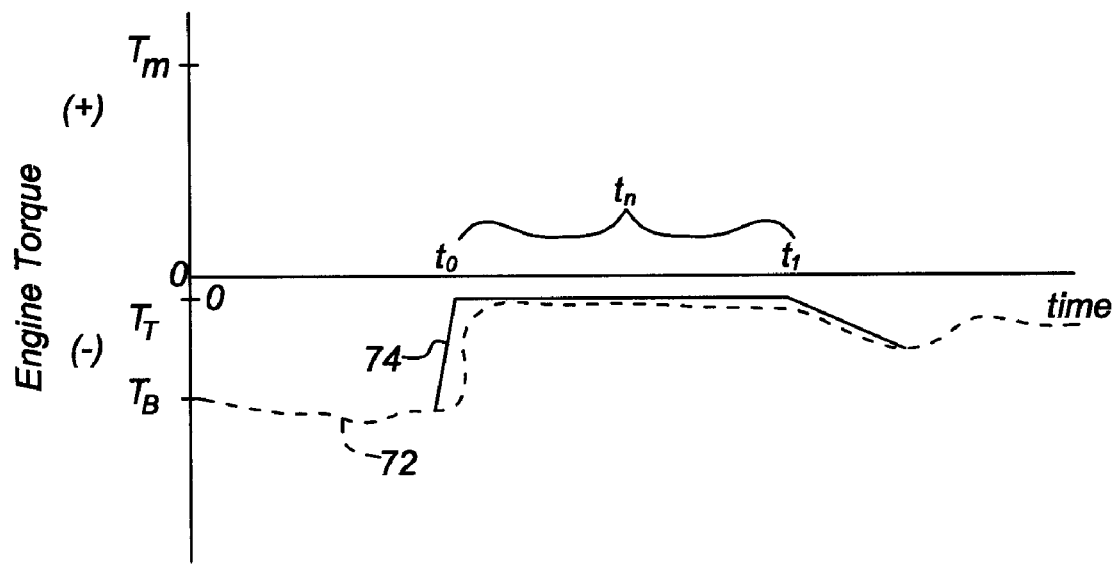
FIG. 3a is a graphical illustration of a portion of the method, shown in FIG. 2; illustrating the release of the lockup clutch of FIG. 1.

Referring now to FIG. 3a, there is shown a graphical illustration of a portion of the method 44, shown in FIG. 2; illustrating the disengagement of the lockup clutch 30. The engine torque value is represented by line 72, while the commanded engine torque value is represented by line 74. At a time equal to zero to $t_0$, the engine 12 experiences a negative torque value $T_b$ indicating that the powertrain 10 is in an engine braking mode of operation. In order to place the powertrain 10 in a more favorable condition to release the lockup clutch 30, the engine 12 is commanded to produce a torque increase at $t_0$ to a near zero and slightly negative target engine torque value $T_t$. The engine 12 then holds the target engine torque value $T_t$ for a time equal to $t_1-t_0$, or $t_h$, to allow adequate time for the disengagement of the lockup clutch 30. This hold time, $t_h$, is preferably a predetermined value and may be determined through experimental or analytical means. At $t_1$, the control of the engine torque to the target engine torque value $T_t$ is discontinued, and the engine torque is allowed to deviate from the target engine torque value $T_t$.

Figure 3B:
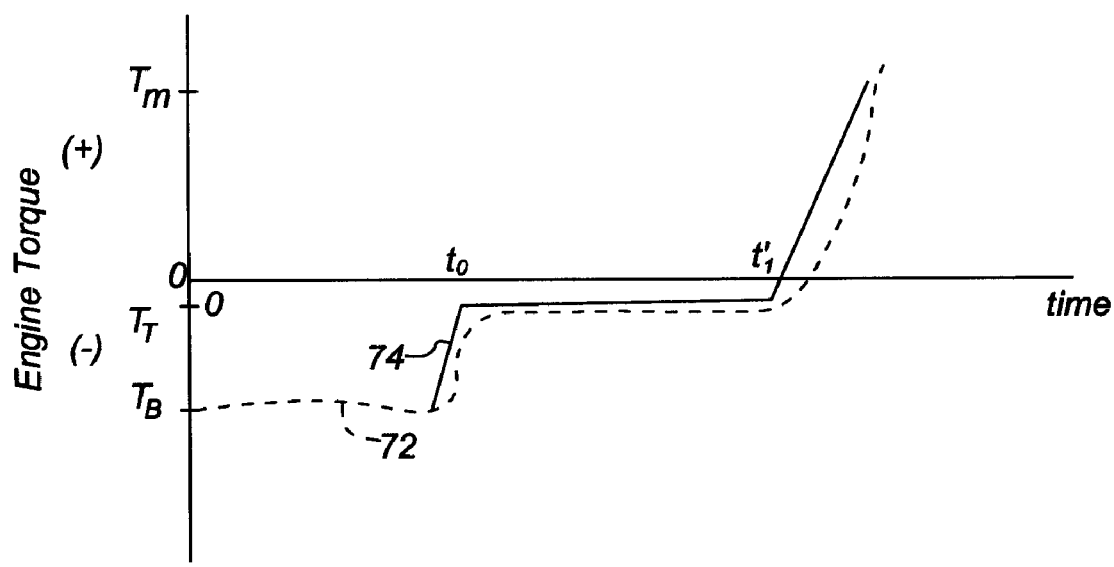
FIG. 3b is a graphical illustration of a portion of the method, shown in FIG. 2; illustrating an aborted release of the lockup clutch of FIG. 1.

Referring now to FIG. 3b, there is shown a graphical illustration of a portion of the method 44, shown in FIG. 2; illustrating an aborted disengagement of the lockup clutch 30. As with FIG. 3a, the engine torque value is represented by line 72, while the commanded engine torque value is represented by line 74. Similar to FIG. 3a, at a time equal to 0 to $t_0$, the engine 12 experiences a negative torque value $T_b$ indicating that the powertrain 10 is in an engine braking mode of operation. In order to place the powertrain 10 in a more favorable condition to release the lockup clutch 30, the engine 12 is commanded to produce an increased torque at $t_0$ to a near zero and slightly negative target engine torque value $T_t$. The engine 12 is held at the target engine torque value $T_t$ until at least one of the abort conditions, described hereinabove with regard to FIG. 2, is met at $t_1'$ at which point, control of the engine torque to the target engine torque value $T_t$ is discontinued and the engine torque value is commanded to deviate from the target engine torque value $T_t$ to a driver command torque value. The engine torque at this point may deviate up to the maximum engine torque value $T_m$, as indicated by line 72 for time values greater than $t_1'$.

Smooth disengagement of the lockup clutch 30 is facilitated by the present invention by placing the powertrain 10 in a more favorable condition for disengagement. By increasing the engine torque value to a zero or near zero value during engine braking, the lockup clutch 30 may be released while reducing the impulse or shock that would otherwise occur.

While the best modes for carrying out the invention have been described in detail, those familiar with the art to which this invention relates will recognize various alternative designs and embodiments for practicing the invention within the scope of the appended claims.

The invention claim is:

1. A method of releasing a lockup clutch for a fluid coupling assembly disposed between an engine and a transmission during a negative engine torque mode of operation, the method comprising:
   commanding the engine to operate at a target engine torque value wherein said target engine torque value is one of a zero and a near zero value;
   holding the engine at said target engine torque value; and
   releasing or disengaging the lockup clutch when the engine is operating at said target engine torque value.

2. The method of claim 1, further comprising determining a current engine torque value prior to commanding the engine to operate at said target engine torque value.

3. The method of claim 1, wherein said near zero value is one of negative and positive.

4. The method of claim 1, further comprising determining if abort conditions are present after commanding the engine to operate at a target engine torque value.

5. The method of claim 4, further comprising commanding the engine to ramp or increase said target engine torque value toward a driver command torque value if at least one of said abort conditions are present.

6. The method of claim 1, wherein the fluid coupling is a torque converter.

7. A powertrain comprising:
   an engine;
   a transmission;
   a fluid coupling assembly disposed between said engine and said transmission and having a lockup clutch operable to substantially lock said engine with said transmission for unitary rotation; and
   at least one controller sufficiently configured to: command said engine to a target engine torque value during engine braking conditions, wherein said target engine torque value is one of a zero and a near zero value; hold said engine at said target engine torque value; and release said lockup clutch when said engine is operating at said target engine torque value.

8. The powertrain of claim 7, wherein said engine is one of a spark-ignited and compression-ignited internal combustion engine.

9. The powertrain of claim 7, wherein said transmission is an automatically shiftable transmission.

10. The powertrain of claim 7, wherein said fluid coupling assembly is a torque converter.

11. The powertrain of claim 7, wherein said at least one controller includes a transmission controller operable to communicate command signals to said transmission and an engine controller operable to communicate command signals to said engine.

12. The powertrain of claim 11, wherein said transmission controller and said engine controller communicate with each other over a data link.

13. The powertrain of claim 7, wherein said near zero value is one of negative and positive.

14. A method of releasing a lockup clutch for a torque converter assembly disposed between an engine and an automatically shiftable transmission during a negative engine torque mode of operation, the method comprising:
   determining a current engine torque value prior to commanding the engine to ramp to a target engine torque value;
   commanding the engine to operate at a target engine torque value wherein said target engine torque value is one of a zero and a near zero value;
   holding the engine at said target engine torque value
   determining if abort conditions are present; and
   releasing the lockup clutch when the engine is operating at said target engine torque value if said abort conditions are not present.

15. The method of claim 14, further comprising commanding the engine to ramp or increase said target engine torque value toward a driver command torque value if said abort conditions are present.

16. The method of claim 14, wherein said near zero value is one of negative and positive.

* * * * *